United States Patent (12) United States Patent
Nguyen (10) Patent No.: US 8,827,243 B2
(45) Date of Patent: Sep. 9, 2014

(54) MEDIA CONTROL VALVE

(76) Inventor: Phuong Taylor Nguyen, Richmone, TX (US)

(*) Notice: Subject to any disclaimer, the term of this patent is extended or adjusted under 35 U.S.C. 154(b) by 80 days.

(21) Appl. No.: 13/286,206

(22) Filed: Oct. 31, 2011

(65) Prior Publication Data

US 2013/0105717 A1    May 2, 2013

(51) Int. Cl.
*B24C 7/00* (2006.01)
*F16K 1/00* (2006.01)
*F16K 3/24* (2006.01)

(52) U.S. Cl.
CPC ............................. *F16K 3/246* (2013.01)
USPC ........................................ 251/321; 451/101

(58) Field of Classification Search
USPC ........... 251/61.2, 61.4, 61.5, 214, 315.7, 319,
251/320, 321, 145, 218, 223, 274, 285;
137/15.17, 15.18, 556, 375; 451/101
See application file for complete search history.

(56) References Cited

U.S. PATENT DOCUMENTS

| | | | | |
|---|---|---|---|---|
| 3,993,099 | A * | 11/1976 | Nightingale | 137/625.48 |
| 4,075,789 | A * | 2/1978 | Dremann | 451/99 |
| 4,120,596 | A * | 10/1978 | Kunkle | 403/14 |
| 4,478,388 | A * | 10/1984 | George | 251/309 |
| 4,493,336 | A * | 1/1985 | Renfro | 137/312 |
| 4,575,047 | A * | 3/1986 | Boos et al. | 251/356 |
| 5,868,160 | A * | 2/1999 | Cords et al. | 137/454.6 |
| 6,607,175 | B1 * | 8/2003 | Nguyen et al. | 251/63.5 |
| 7,300,336 | B1 * | 11/2007 | Nguyen et al. | 451/101 |

* cited by examiner

*Primary Examiner* — John K Fristoe, Jr.
*Assistant Examiner* — Kevin Barss

(57) ABSTRACT

A media control valve includes a body, a plunger assembly of multiple components housed in the body with a plunger control valve cap assembly secured to the body for housing a control knob. The body and the plunger assembly include resilient seals between adjacent multiple components of the body and the plunger assembly, respectively, to permit relative movement therebetween. A diaphragm physically isolates and seals the chambers above and below. All of the plunger seals and bushings held within the sleeve. Replacement seals and bushings can be replaced and inspected with relative ease due to the accessibility at both ends of the sleeve. Component parts are assembled using resilient seals to facilitate assembly and repair.

18 Claims, 5 Drawing Sheets

MEDIA CONTROL VALVE

BACKGROUND

1. Field of the Invention

The present invention is related to media control and, more specifically, media control valves used to control the flow of a media into a fluid stream as part of an apparatus for treatment of a surface.

2. Description of the Related Art

A typical manual media control valve is disclosed in U.S. Pat. No. 4,322,058("the '058 patent"). The valve of the '058 patent is attached to a media vessel and controls the flow of the media from the media vessel into a conduit containing a fluid stream. This conduit terminates in a nozzle. Fluid and media pass through the nozzle at high speed and are typically used to treat surfaces.

A more recent pneumatic actuated media control valve is the pipe side valve shown and described in U.S. Pat. No. 3,476,440 ("the 440 patent"), issued to Thompson, et al on Mar. 30, 1982. The valve described in this patent has been has been widely accepted in applications where the flow of particulate material, particularly abrasive material, from a tank or hopper, is fed into a blast line for propelling the particulate material or media through a nozzle.

As shown in the '440 patent, the valve has a unitary plunger which is movable axially with respect to a lateral particulate material inlet between positions closing and opening the inlet. The plunger is moved by pneumatic or spring force against the piston. The valve body passage through which the plunger is disposed, and the plunger itself, are formed to have abrasion resistant surfaces. A lateral air pipe nipple sealed to the valve body receives the abrasive material flowing through the valve for use in blasting operations.

Various improvements to the basic media control valve have been proposed. For example, U.S. Pat. No. 5,407,379 ("the '379 patent") and U.S. Pat. No. 5,401,205 ("the '205 patent") disclose media control valves having a media passage between the media control valve and the conduit. The media passage converges into a slot-shaped outlet in the conduit so as to reduce the perimeter of the outlet placed perpendicular to air flow and consequently reduce turbulence as air passes across the outlet. The media control valves disclosed in the '205 and '379 patents are particularly useful in metering and dispensing sodium bicarbonate media.

Over the years many modifications to media control valves have been proposed. For example, U.S. Pat. No. 5,810,045 ("the '045 patent") discloses a pneumatic actuated metering control valve for introducing particulate materials into a high-pressure air stream and suggests several uses for this valve, such as, by way of example, introducing fluid catalytic cracking catalyst particles into fluid catalytic cracking units used to crack and reform various petroleum based products, introducing particulate catalysts into other kinds of chemical processes and spraying particulate ingredients on adhesive substrates as part of various manufacturing processes.

U.S. Pat. No. 5,407,379 ("the '379 patent") and U.S. Pat. No. 5,401,205 ("the '205 patent") disclose a pneumatic actuated media control valve having a media passage between the media control valve and the conduit. The media passage converges into a slot-shaped outlet in the conduit so as to reduce the perimeter of the outlet placed perpendicular to air flow and consequently reduce turbulence as air passes across the outlet. The '045 patent also includes the use of multiple seals around a plunger of the valve with an exhaust therebetween to remove any contaminants that breach the seals.

Another type of valve used in the industry is the manual metering valve shown and described in my U.S. Pat. No. 7,549,911, entitled: "Media Control Valve with Pressure Balance Loop". The valve there shown incorporates a bypass loop for equalizing pressure during startup operation. Specifically, the valve includes a pressure fluid inlet upstream of the valve media outlet. When the valve system is off, the system is typically depressurized. In typical applications, a backflow into the valve is caused by the fact that on startup the pressure increase in the media tank is at a slower rate than the pressure increase in the blast line. Thus, there is a backflow from the blast line into the valve until both the media tank and the blast line pressures are equal. This continues until the valve is again equalized with the media flowing through the valve and into the pressurized fluid stream. The valve so disclosed incorporates a balancing or equalizing pressure loop for minimizing or reducing the backflow of pressurized fluid into the valve through the media outlet port during startup. The valve also includes a cleanout port for cleaning out debris that may obstruct media flow and residue media after use. This permits clean out of the valve without disassembly. The ability to clean out the valve after use further reduces wear and tear on the valve and minimizes maintenance and repair.

Despite the various improvements in myriad valve designs for a variety of applications, the valve disclosed in the Thompson patent is to this day a widely accepted valve for blasting operations. As desirable as this valve is, there remains room for improvement, especially with respect to wear reduction, as well as repair and maintenance of the valve.

One of the most critical issues with remote actuated media control valves is the life of the valve. The abrasive media can damage the valve beyond use in a short period of time, requiring replacement or substantial repair. Many of the valves of the prior art, as particularly shown in the '440 and '045 patents, typically have a sleeve that consists of a hardened liner (tungsten carbide or hardened steel) jacketed with a softer material. In these configurations, the hard liner is jacketed and bonded with stainless steel with the ID of the jacket being flush with the ID of the hard liner. The valve plunger is of the same type construction, except that the jacket is a hard material and the inside is a softer more workable material. It is not uncommon for any of these valves to malfunction after some use due to the sleeve and plunger locking up, thereby not allowing the plunger to reciprocate within of the sleeve. In some cases, solid hardened sleeves are utilized. In either case when plungers lock up or seize, accelerated wear results on the adjacent components of the valve such as the body, seat, and base.

The '045 patent purports to keep particulates from entering the cylinder chamber, and thereby improve the life of the valve. However, this patent does not address the more frequent mode of failure where the plunger binds against the sleeve, or is seized. A gap is required for assembly of the plunger into the sleeve. Any feasible designed gap will allow migration of particles smaller than the gap. In addition, as the plunger and sleeve are abraded, the gap will become progressively larger and allow larger abrasive particles to migrate.

Most, if not all of the prior art valve designs use a plunger sleeve design. All of these valves place the plunger seal(s) above the sleeve. While these designs have been effective at sealing, there are two issues. First is the accessibility of the seals. Many of these valves use a single plunger seal above the sleeve which is relatively easy to access but sometimes requires a user to completely remove the valve to properly replace the plunger seals. More recent valve designs include up to three plunger seals with an external o-ring. At least one prior art valve has four plunger seals with a stainless steel bushing stacked above the sleeve. In many of these valves it is very difficult to change out the seals due to the deep location of the seals with the inherently gritty environment. In valves utilizing the multiple plunger seal design, the plunger seals are stacked on top of each other which is a blind install that does not permit visual verification of proper seal alignment or seal installation. Also, this will create boundaries where two soft surfaces press against each other, and which creates an opportunity for the seals to misalign when stressed during plunger movement or during installation or operation.

It has been determined that this seizing can be attributed to several factors. First, the stainless jacket on the sleeve wears at the ID more quickly than at the hard liner primarily because of the difference in hardness of the two materials. This creates a beveled surface between the sleeve stainless ID and plunger OD where particles would cause binding. Second, the stainless ID section of the sleeve is softer than some of the abrasive media used, such as aluminum oxide grit or hardened steel grit. These harder particles can dig into the relatively softer yet still rigid stainless steel and cause binding between the plunger and sleeve.

Third, this design permits the accumulation of grit within the plunger-to-sleeve gap. The reciprocating motion combined with the location of the plunger, sleeve, and piston of this valve and its many variations results in a scooping effect that over time will bind this type of valve. Each time the valve is actuated, a small amount of grit or abrasives, smaller than the plunger to sleeve gap, is scooped or dragged upward in between the sleeve and plunger. When the pneumatic signal is removed and vented, the plunger returns to the closed position, dragging some of the small grit back but leaves a small residual of grit or abrasives. With each actuation, the residual grit accumulates. After many cycles, the accumulated grit will effectively form a wedge that will bind the OD of the plunger against the ID of the sleeve. Easily crushable mineral abrasives do not cause as much of a problem as more resilient abrasives such as hardened steel grit and Aluminum oxide. This is a problem with all plunger-sleeve designs in the airblast industry regardless of their hardness and regardless of their material composition.

Recently, valve designs including an offset sleeve internal diameter and plunger seals of the spooled sleeve have been designed in an attempt to minimize the issue by not allowing or significantly reducing the accumulation of residual abrasives. In addition, the grit that does bypass the seals is so small that they polish the OD of the plunger and consequently improve the life of the seals above the first one. This is the benefit implementing the aforementioned offset sleeve feature with the spool sleeve seals.

The current state of the art for these types of valve is a piston actuated design where a compressed air signal is used to apply force against a spring counteracted piston sealed with piston seals, both within a cylinder. When the compressed air signal is removed, the spring pushes the piston back to its off position which is generally closed. The plunger which is fastened to the piston is what directly opens and closes the abrasive flow.

The weakness of this design is that it is not tolerant of particulate contamination which is inherent of the dusty and gritty conditions of an airblast environment. This contamination can originate from two sources. First is the ambient environment of the equipment and valve. In the valve as disclosed in the '058 patent, and its many variations, the ambient dust will be sucked in when the piston returns to the off position. As the piston travels to its off position, the volume above the piston increases and must draw air from an ambient source. As the dust and grit laden ambient air is drawn in, so too is the grit. Many of the prior art valves, try to mitigate this by installing breather vents with particulate filtration varying from 15-90 microns. When the breather vent is sized properly, the particulates that pass through and enter the cylinder are not large enough to cause the piston to jam, or seize. Breather vents are an additional cost and properly sized fine breather vents are even more expensive. Some end users have even tried to replace the vents with cheaper larger micron vents and have experienced failures. The second source of grit contamination is from the compressed signal line. Blast systems with inadequately supplied compressed airflow tend to pull grit from the blast pot or vessel and cause dust and grit to eventually contaminate the compressed air control line. Where the first source originates from ambient and will contaminate the cylinder volume above the piston, the second source of contamination will reside below the piston. Both have the potential to bind the piston against the cylinder wall.

Typically, in the prior art designs, the piston and piston seal do not function efficiently and fail quickly without lubrication. The lubrication is required to reduce the piston-to-cylinder friction and reduces the response time of the valve. While lubrication serves to minimize the wear of the piston seal which is required for proper actuation of the valve, its consistency is like paste when applied. In some cases oil or light fluids are used. Both types of lubrication have a tendency to attract dust which can contribute to the piston to cylinder binding.

Many prior art plunger sleeve designs utilize a straight cylindrical sleeve inserted within a straight cylindrical cavity that is slightly larger the outsider dimensions of the sleeve. Inherent to this design, grit will find its way and reside between the outside of the sleeve and inside of the valve body. This will significantly increase the force required to remove the sleeve from the body. Also, due to the straight cylinder and mating cavity, the grit continues to roll and slide which creates friction until the sleeve is completely removed. This makes disassembly relatively difficult.

Many of the prior art valves use variants of a tungsten carbide plunger fused or joined to a stainless shaft with bolt threads to fastened the piston. Generally the wear on these occur due to the sliding and rubbing of the plunger against the inside of the sleeve with abrasive grit between them. Consequently, the wear is mainly in this area. Generally, it has been observed that the stainless portion of the plunger is still in good condition. However, since it is fused to the tungsten carbide, the still new stainless is discarded along with the worn Tungsten.

It is desirable to improve on the various prior art designs by incorporating design changes which facilitate maintenance and repair of the valve. As stated, the primary wear portions of the valve are the plunger and the sleeve. In many prior art valves, the entire plunger assembly must be removed and the valve completely disassembled in order to replace the worn components. Likewise, the sleeve can only be replaced by disassembling the entire valve.

It is desirable to provide a media control valve permitting more cost effective maintenance by reducing the replacement requirements for those components which are not subject to wear, to provide a more effective body gasket and seal system and to permit easier assembly and disassembly.

SUMMARY OF THE INVENTION

The subject invention is directed to a media control valve with a valve body having a media inlet and a media outlet and a plunger which is positioned within the valve body. The plunger is connected to a metering control assembly in the bore of the valve body and can be removed without disturbing the control assembly. A sleeve is positioned in the valve body between the valve body and the plunger.

In one aspect of the invention, the media control valve includes a diaphragm which eliminates the piston and piston seal. The diaphragm acts as a membrane that physically isolates and seals the chambers above and below. The pistonless design means that that there is no piston to slide and seal against the cylinder wall. This results in less sliding friction and eliminates one less area where grit can bind the valve. Dust and grit from ambient or a contaminated compressed air line will not bind the valve. The breather vent becomes less critical. In addition, less friction means more of the mechanical forces are available to open and close the valve resulting in quicker, more efficient, and more reliable valve action. Also, the diaphragm designs do not require lubrication, which speeds assembly time and also minimizes the environmental impact from the chosen lubricant.

In another aspect of the invention, the spool sleeve design has all of the plunger seals and bushings held within the sleeve. This allows removal of all of the seals along with the removal of the sleeve. In some cases, not all but some of the seals are inside the sleeve, which is consistent with one aspect of the invention. Once the spool sleeve is removed, the replacement seals and bushings can be replaced and inspected with relative ease due to the accessibility at both ends of the sleeve. Since each plunger seal is held within its own rigid cavity, held on three sides and not stacked on top of another seal or loose component, proper alignment is better assured during and after installation.

It is an important feature of the valve of the subject invention that the rigid assembly between components as is common in the prior art valves has been replaced with a floating design with components being assembled using numerous resilient seals and spacers between rigid members, permitting the assembly to self-center or self-position. This minimizes or even eliminates the tendency of various components to bind during operation, particularly as a result of normal operation and normal wear. This also assures proper alignment of the various components by permitting relative movement between components during operation. The floating design of the subject invention also facilitates in maintenance and repair by permitting the assembly to be disassembled by relying on the relative ease in removing the resilient seals.

Even in prior art designs having a single plunger seal, the spool design of the subject invention will allow for additional space to include additional plunger seals or wipers which will improve the life and versatility of these valves, as well. Also, the addition of a wiper immediately above the tungsten carbide liner keeps all the grit between carbide-to-carbide surfaces, thus reducing sliding friction and preventing the accumulation of residual grit between the plunger and sleeve.

In yet another aspect of the invention, the composite sleeve may incorporate a soft urethane or equivalent material to liner or encapsulate a hard abrasion resistant material such as tungsten carbide or hardened stainless steel. The softer thermoplastic liner will allow for easy removal while the hard lining will provide longevity and durability.

Revising the cavity to have a taper allows the gap relative to the sleeve to increase during extraction or removal thus decreasing the bind and rolling and allow the sleeve to release easily. In addition, a taper, at the same angle as the mating inside surface of the body, can be utilized. This will further ease the release of the sleeve from the body.

The modular plunger design of the subject invention utilizes fasteners to fix the tungsten carbide to the stainless. In this design, the tungsten slides over the stainless with three seals between them and held in place with a bolt screwed into the stainless shaft. The tungsten liner can be removed and replaced onto the stainless. This reduces the cost of the replacement part by reusing the stainless plunger shaft. In addition, the two o-rings and washer seals allow the tungsten carbide to "float" and find its concentricity within the sleeve. Although the float is small it prevents a bind due to misaligned or eccentric sleeve and plunger centerlines. The softer sleeve liner such as urethane, as mentioned above, allows the harder sleeve liner to conform for concentric alignment with the plunger centerline.

DETAILED DESCRIPTION

Referring initially to FIGS. 1, 2, 3A, 3B, 4A and 4B, the valve assembly includes a valve body 1 for housing the valve plunger assembly, the spool sleeve assembly and the lower diaphragm plate 5b (see, for example FIGS. 3A and 3B), as will be explained with reference to FIGS. 5-8. The valve cap assembly 3 is secured to the body 1 and houses the diaphragm 4 (best shown in FIGS. 4A and 4B), upper diaphragm plate 5a and the metering knob assembly terminating in the metering knob 14. The upper valve assembly, comprising the body 1, the cap assembly 3, knob assembly including knob 14 and the internal components are typically secured to the valve base 2 by a series of bolts or similar fasteners 18. Typically, a washer 19 is positioned between each bolt head and the valve body 1, as shown.

The pressurized indexing air or control fluid is introduced into port 40, as indexed or metered by the position of the metering knob assembly terminating in metering knob 14. Abrasive media is introduced into the valve at port 42. The abrasive media is released into the main flow line 44 in the base 2 through the valve outlet 46 (see FIGS. 3A and 3B). Port 40 is a pneumatic signal port which would be controlled from a remote controlled valve. The air pressure and flow through port 40 will allow pneumatic pressure to exert mechanical force onto the diaphragm and lower plate 5*b* to actuate and open the valve. How much the plunger is allowed to travel is determined the position of the manually adjusted knob assembly 14, which determines how much of the sleeve orifice open, thus controlling abrasive flow.

As stated, in one aspect of the invention, the media control valve includes a diaphragm 4 which eliminates the piston and piston seal. The diaphragm acts as a membrane that physically isolates and seals the chambers above and below. The media control valve includes a body assembly having a valve cap assembly 3 and a lower plunger body 1. A movable plunger assembly comprising plunger 6 and control stem 30 are housed in the body for axial movement along the substantially central axis of the body. Typically, the valve includes an air inlet port 40. The flexible diaphragm 4 is positioned between the upper cap assembly 3 and the plunger body 1 and is in communication with the port 40. The flexible membrane or diaphragm 4 is secured to the body and the plunger stem 60 and is adapted for movement with the plunger assembly. In the preferred embodiment, the diaphragm 4 is circular in shape with its outer edge being sandwiched between the upper and lower body portions 1 and 3. The diaphragm has a central hole through which the plunger stem 60 can pass and the diaphragm is secured to the plunger stem 60 by sandwiching the diaphragm 4 between two mounting plates 5*a* and 5*b*. The diaphragm 4 moves between the nested position of FIGS. 3*a*, 3*b* and 5 and the metering position of FIGS. 4A, 4B in unison with the plunger 6, as will now be explained.

Figure 1:
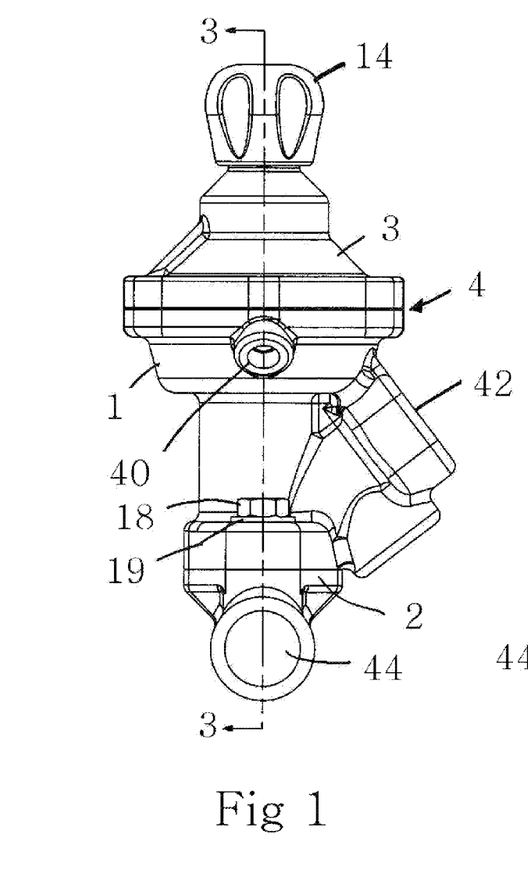
FIG. 1 is a front view of a valve incorporating the features of the subject invention.
Figure 2:
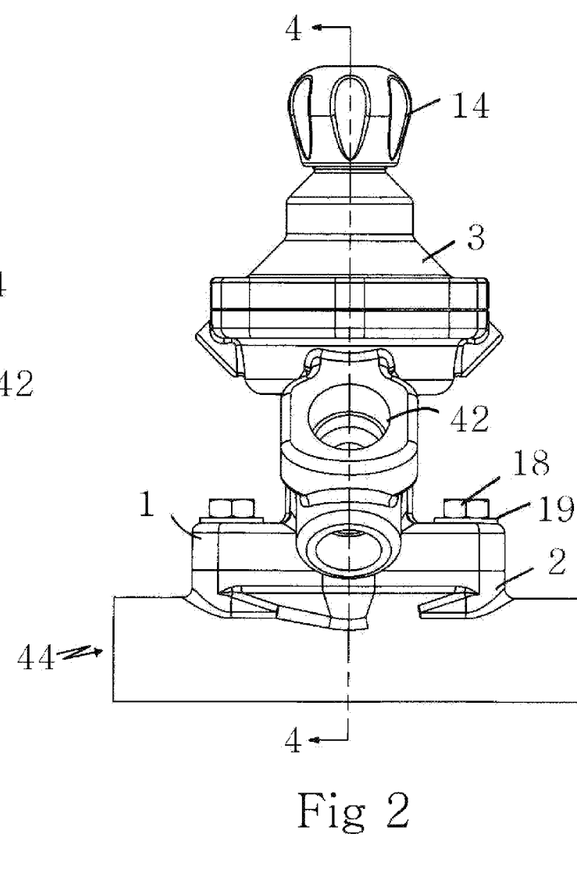
FIG. 2 is a side view of the valve shown in FIG. 1.
Figure 3A:
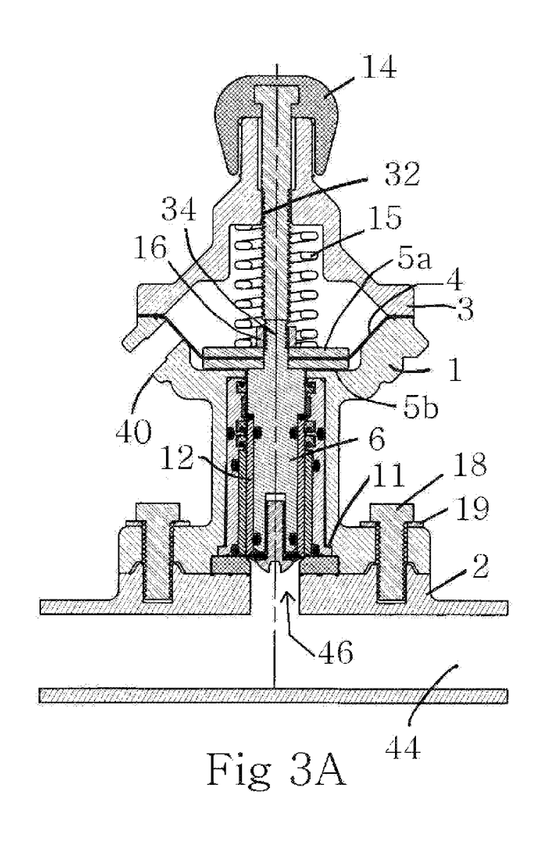
FIG. 3A is a sectional view taken along line 3-3 of FIG. 1, showing the valve in the closed position.
Figure 3B:
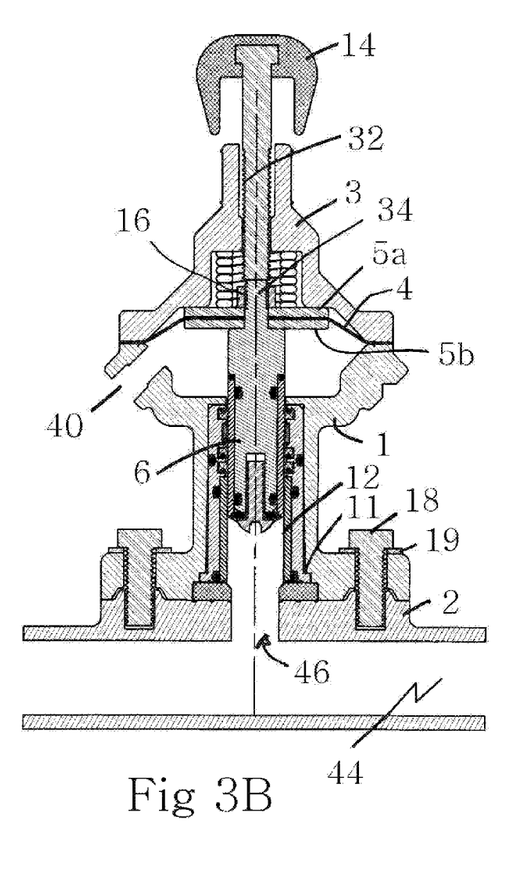
FIG. 3B is a sectional view taken along line 3-3 of FIG. 1, showing the valve in the fully open position.
Figure 4A:
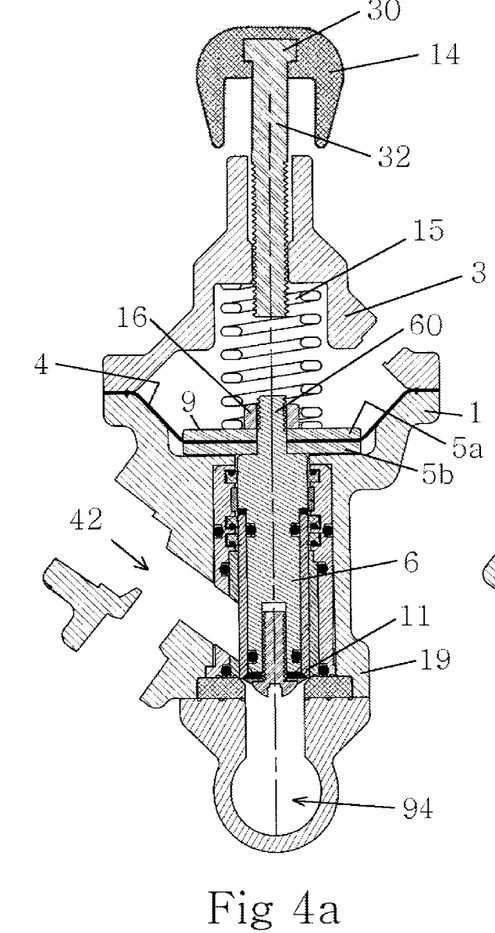
FIG. 4A is a sectional view taken along line 4-4 of FIG. 2, showing the valve in the closed position.
Figure 4B:
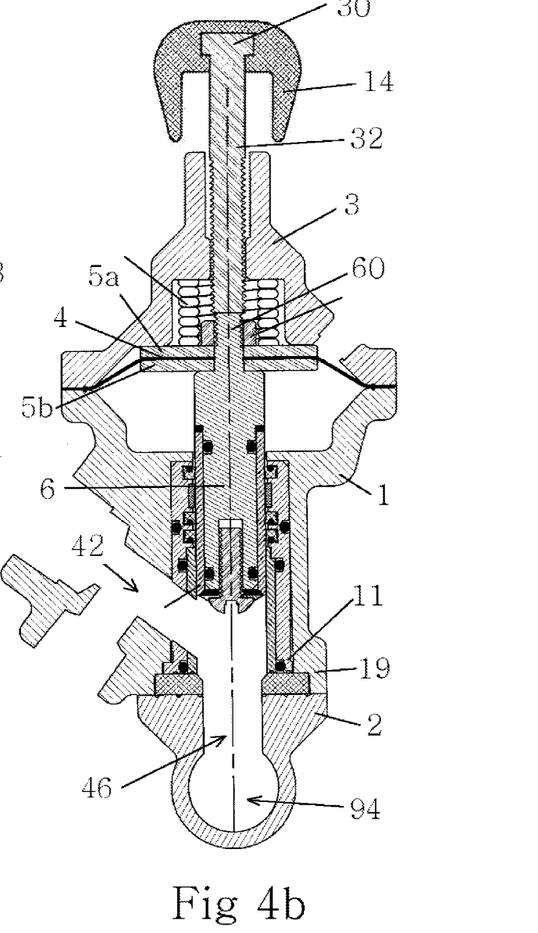
FIG. 4B is a sectional view taken along line 4-4 of FIG. 2, showing the valve in the fully open position.
Figures 5, 5A, 5B:
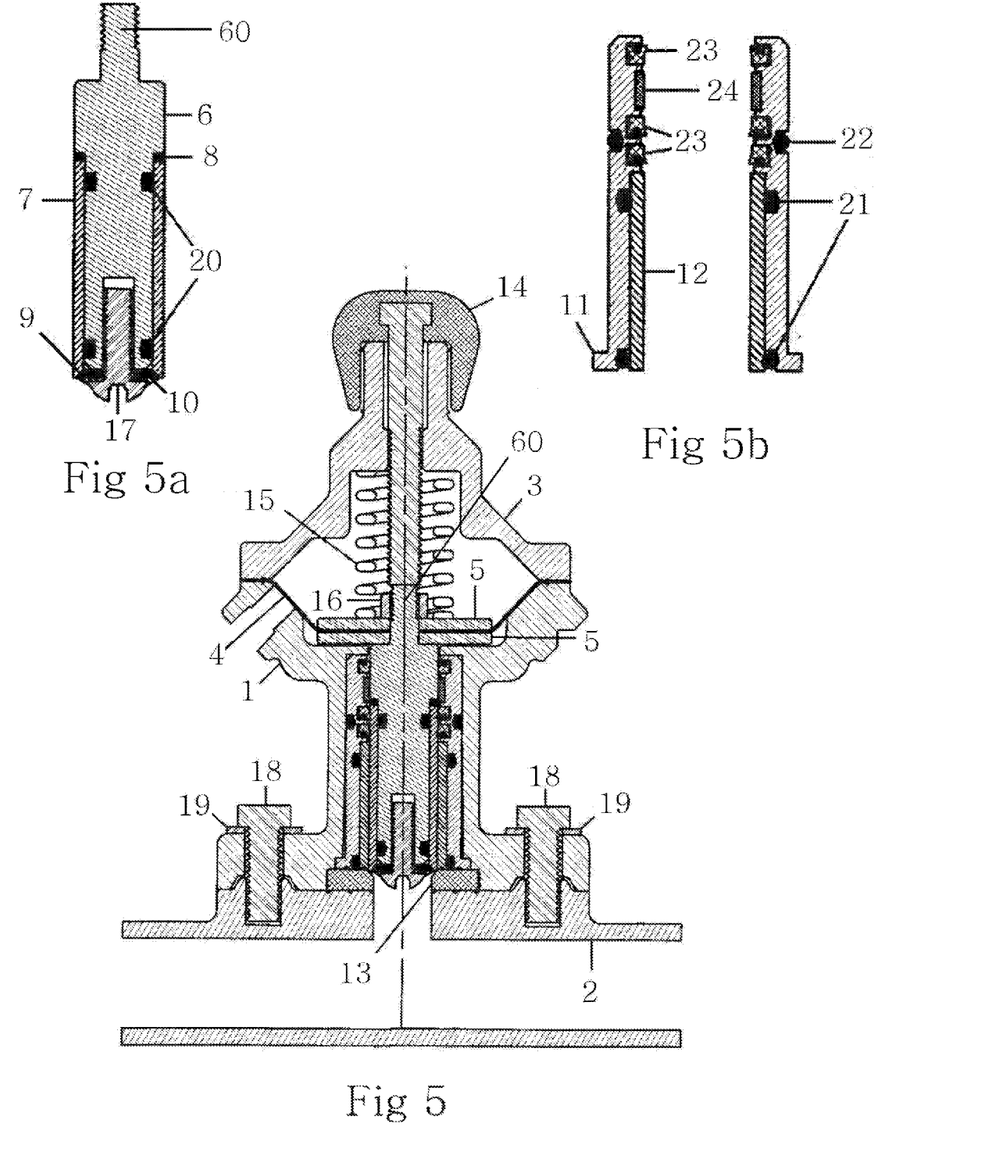
FIG. 5 is a view looking in the same direction as FIG. 3a, with the valve in the fully closed position, and with additional component views showing the plunger assembly and the sleeve assembly.
FIGS. 5A and 5B are fragmentary views take from FIG. 5, showing the plunger assembly and the liner sleeve and liner assembly, respectively.
Figure 6:
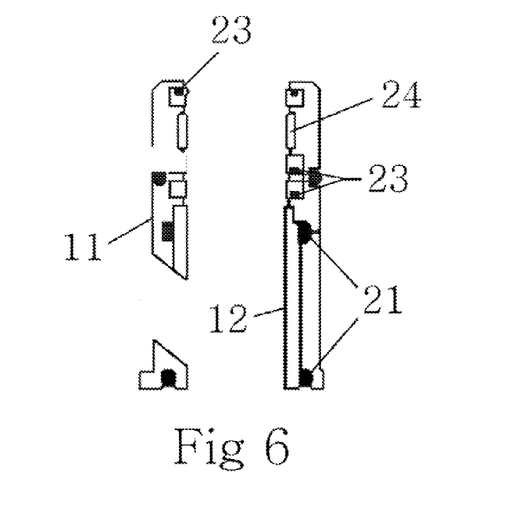
FIG. 6 is a diagrammatic sectional view of the spool sleeve and liner design.

The valve is shown in the fully closed position in FIGS. 3A, 4A and 5. The valve is shown in the fully open position in FIGS. 3B and 4B. The valve metering system, consisting of the plunger assembly 6, the metering knob assembly 14 is moved to selected positions between the fully closed position and the fully open position by turning the knob assembly in the tapped bore 32 in the valve cap assembly 3. When fully open, the knob assembly is extended outwardly from the cap assembly 3, the spring 15 is fully compressed when compressed air enters through the port 40, with the metering bolt or stem limiting the travel of the plunger, as shown in FIGS. 3B and 4B. The media port 42 in the body 1, and in communication with the plunger assembly 6, is also fully open. When signal at port 40 is stopped, the spring 15 acts to push the plunger assembly downward, as drawn, and the plunger closes media port 42, while the diaphragm moves to the position shown in FIG. 4A.

One of the novel features of the subject invention is the diaphragm assembly comprising the diaphragm 4 and the upper and lower diaphragm plates 5*a* and 5*b*. The diaphragm 4 includes an outer flange 50 which is positioned between the outer flange 52 of the valve body 1 and the outer flange 54 of the cap assembly 3. The diaphragm is held in assembly when the valve body is secured to the cap. The diaphragm 4 is sandwiched between the upper and lower diaphragm plates 5*a* and 5*b*, and secured on the stem 60 of the plunger 6 by a nut or similar fastener 16. The metering knob assembly is rotated into and out of the valve cap. This will permit the plunger 6 to move upward against spring 15 depending upon the metering position, when compressed air is introduced into port 40 as a pneumatic control signal, as previously described, see FIGS. 3B and 4B. When compressed air flow is stopped, the spring 15 forces the plunger down, closing the port 42, see FIGS. 3B and 4B. Port 40 is usually vented to the atmosphere to allow the spring to push the diaphragm back.

The diaphragm design eliminates the piston and piston seal. The diaphragm acts as a membrane that physically isolates and seals the chambers above and below. The pistonless design means that that there is not any piston to slide and seal against the cylinder wall. This results in less sliding friction and eliminates one less area where grit can bind the valve. Generally, dust and grit from ambient or a contaminated compressed air line will not bind the valve. The breather vent becomes less critical. In addition, less friction means more of the mechanical forces are available to open and close the valve resulting in a quicker, more efficient, and more reliable valve action. Also, the diaphragm design does not require lubrication, which speeds assembly time and also minimizes the environmental impact from the chosen lubricant.

An additional novel feature of the invention is the spool sleeve design of the valve. The spool sleeve has all of the plunger seals and bushings held within the sleeve. Specifically, and with particular reference to FIGS. 5, 5B, 6 and 7, the spool sleeve 11 is constructed of a relatively soft material, such as stainless steel or even polyurethane. The hardened liner 12 may be made of tungsten carbide or another suitably hardened material.

The sleeve 11 is adapted to be received in the central bore of the valve body 1, with the plunger 6 positioned in the central bore in communication with the sleeve assembly. The sleeve 11 is a substantially cylindrical member having an outer diameter adapted to be received in the central bore and an inner diameter adapted to receive the liner 12. The liner 12 has an outer diameter adapted to be received in the sleeve inner diameter and an inner diameter adapted to receive the plunger 6. There is at least one removable liner seal 21 (see FIG. 5B) between the sleeve inner diameter and the liner outer diameter. In the preferred embodiment the liner seal 21 comprises the o-ring. Also, as shown, it may be desirable to include multiple seals 21. Typically, the sleeve liner includes a circumferential channel for receiving and seating each seal 21.

Figure 7:
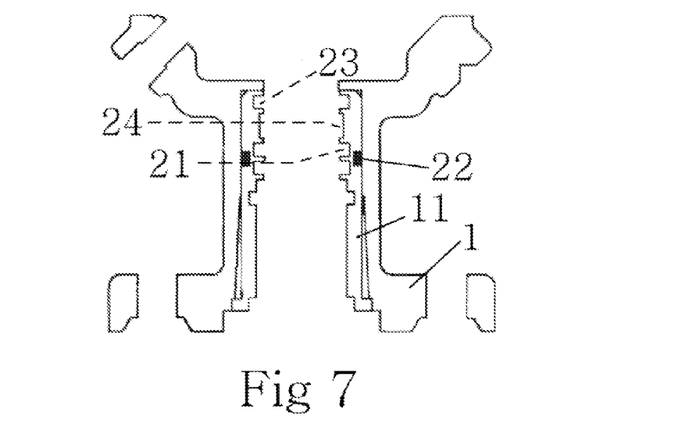
FIG. 7 is a diagrammatic sectional view, with angles exaggerated for clarity, showing the tapered sleeve release.

The outer diameter of the cylindrical spool 11 is tapered relative to the central bore of the media control valve, shown exaggerated in FIG. 7. In the preferred embodiment, there is at least one removable bore seal 22 (see FIG. 5B) positioned between the central bore of the body 1 and the outer diameter of the spool 11. While shown as on the circumference of the spool 11 in the drawing, see FIGS. 5, 5B and 7, it can also be placed at the top of the spool between the body 1 and the spool.

In the preferred embodiment the bore seal 22 is an o-ring. The sleeve outer diameter includes a circumferential channel for receiving and seating the o-ring (see FIG. 7). It should be understood by those who are skilled in the art that seals other than an o-ring configuration can be employed with equal performance capability. The sleeve 11 is of longer longitudinal length than the liner 12, wherein the portion of the sleeve outside the liner is of an intermediate inner diameter larger than the inner diameter of the liner but smaller than the inner diameter of the sleeve. This allows the particles in the blast media to disengage and roll more freely instead of being dragged, as with the prior art. As best shown in FIG. 5B, at least one circumferential seal 23*a* is positioned in the intermediate diameter portion and is adapted for contacting the plunger. In the preferred embodiment there are multiple seals 23*a*, 23*b* and guide 24. Circumferential channels may be provided in the intermediate diameter of the sleeve 11 for receiving and seating the seals 23*a*, 23*b* and guide 24. In the preferred embodiment the plunger seal 23*a* is oriented "cup-up", opposite the two lower seals 23*b* which are oriented "cup-down" in order to provide maximum sealing function in both directions.

During use of the valve, the wear is primarily on the liner 12. In order to facilitate repair and replacement, all of the seals between the sleeve and liner are located on the sleeve.

Specifically, O-ring seals 21 are located on the sleeve near the top and bottom of the liner. As best showing in FIG. 6, packing material, generally of a soft material such as polyurethane or the like is positioned as a pack 25, and may include integral O-rings 70, as shown. An internal wear ring 24 is located on the ID of the sleeve, above the liner 12 and the pack 25 An internal plunger seal 23*a* is also located on the ID of the sleeve and positioned above the internal wear ring 24.

This configuration permits removal of all of the seals along with the removal of the sleeve 11 and liner 12 from the valve body 1. Once the spool sleeve is removed, the replacement seals and bushings can be replaced and inspected with relative ease due to the accessibility at both ends of the sleeve. Since each plunger seal 23 and 70 is held within its own rigid cavity, held on three sides and not stacked on top of another seal or loose component, proper alignment is better assured during and after installation, as well as during use.

On prior art single plunger seal designs, the new spool design allows for additional space to include additional plunger seals or wipers which will improve the life and versatility of these legacy valves. This could dramatically improve the legacy design and even existing installed valves. The addition of the pack seals 23, or wiper seal, above and closer to the liner 12 keeps grit from accumulating between carbide-to-carbide surfaces on the liner 12 and the plunger wear sleeve 7 (see FIGS. 5, 5A and 8), thus reducing sliding friction and minimizing one cause of binding.

Prior art designs, such as, by way of example, the configuration shown in U.S. Pat. No. 7,300,336, permit the fine grit to pass the wiper and be lodged between the plunger OD and sleeve and roll instead of slide. Using the configuration of the subject invention it has been found that a super hard grit such as aluminum oxide actually polishes the plunger which improves plunger seal life and valve life.

With reference to FIGS. 5, 5A, 5B and 6, it should be noted that the configuration of the subject invention permits the use of a soft urethane or equivalent material for the sleeve 11, and while the liner 12 liner is made of a hard abrasion resistant material such as tungsten carbide or hardened stainless steel. The softer thermoplastic material will allow for easy removal while the hard liner will provide longevity and durability. Also, a softer sleeve liner such as urethane will allow the harder sleeve liner to conform for concentric alignment with the plunger centerline.

Although the urethane sleeve 11 is much easier to remove than the tungsten or stainless steel sleeves, it is still difficult to remove when employed in prior art designs. In the subject invention, and as specifically shown in FIG. 7, the body cavity 76 is modified to have a taper (shown exaggerated for clarity). In practice, the taper is very slight, but permits the gap relative to the sleeve to increase, thus reducing the bind and rolling and allow the sleeve to release easily. In addition, a taper, at the same angle as the mating inside surface of the body, can be utilized. This will further ease the release of the sleeve from the body. Specifically, the taper can be provided on the ID of the body cavity, the OD of the sleeve, or both. Mated taper surfaces may also be used, which will eliminate the gap when the sleeve is fully seated, but permit the same beneficial results as the sleeve is withdrawn from the valve body.

Figure 8:
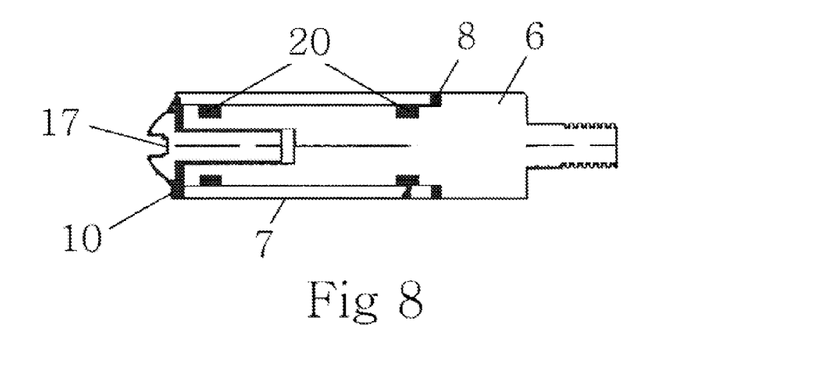
FIG. 8 is a diagrammatic sectional view showing the modular plunger design.

The valve assembly of the subject invention also includes a modular plunger assembly 6, as best shown in FIGS. 5 and 8. As is typical, the plunger assembly 6 is axially movable along the central axis of the body. In the subject invention the plunger assembly includes a central core 6*a* having an outer diameter and made of a first material, and a plunger sleeve 7 having an inner diameter of sufficient size to permit the sleeve to be placed in a surrounding relationship with the plunger core. There is at least one removable seal 20 placed between the outer diameter of the plunger core and the inner diameter of the plunger sleeve. In the example, there is a seal 20 placed at or near the top of the sleeve 7 and a second seal placed at or near the bottom of the sleeve 20. The outer diameter of the plunger core and the inner diameter of the plunger sleeve are sized such that the plunger sleeve can be moved relative to the plunger core without interference. Typically, the plunger sleeve is constructed of a harder material than the plunger core. It may be desirable that one of the mated diameters of the plunger sleeve and the plunger core are tapered to provide additional clearance therebetween. In some cases, it may be desirable that both the core and the sleeve be tapered. This facilitates axial movement between the plunger sleeve and the plunger core in one axial direction, specifically for replacement of the sleeve on the core during assembly and maintenance. It is also desirable to provide a channel in the plunger core for receiving and seating each seal 20.

The upper portion of the plunger core 6*a* is of a larger outer diameter than the lower portion and is substantially similar to the outer diameter of the sleeve 7 which is placed over the lower, lesser diameter of the plunger core. The top edge of the sleeve 7 is positioned to provide a gap between the sleeve and the upper portion of the plunger core. A washer seal 8 is placed in the gap. Typically, the seal 8 is a flexible, removable seal, such as, by way of example an o-ring seal. The removable seal has an outer diameter which is no smaller than the larger outer diameter of the plunger core.

In the preferred embodiment, the modular plunger assembly 6 includes the core 6*a* and an outer plunger sleeve 7. Typically, the sleeve 7 is made of a hardened material such as tungsten carbide and the core 6*a* may be made of a much softer material, such as, by way of example, stainless steel. The sleeve 7 is secured to and lines the core 6*a*. In the example, the sleeve 7 is secured to the core 6*a* by means of a fastener such as the retaining washer 10 and a threaded fastener such as the screw 17. The washer seal 8 is provided at the junction of the top of the sleeve and the core. Internal O-rings 20 are provided between the sleeve 7 and the core 6*a*.

In this configuration, the tungsten sleeve 7 is adapted to slide over the stainless core 6*a* with three seals 20, 20 and 8 between them, held in place with a bolt or screw 17 and flexible or soft retaining washer 10. The tungsten sleeve or liner 7 can be removed and replaced onto the stainless core 6. This will reduce the cost of the replacement part by reusing the stainless plunger shaft and core. In addition, the two o-rings 20, 20, resilient seal 8 and flexible washer 10 allow the sleeve 7 to "float" and find its concentricity within the sleeve. Although the float is small it prevents a bind due to misaligned or eccentric sleeve and plunger centerlines.

While certain features and embodiments have been described in detail herein, it will be understood that the invention encompasses all modifications and enhancements within the scope and spirit of the following claims.

The invention claimed is:

1. A media control valve of the type having a body with a central bore and a spool sleeve positioned in the central bore, the media control valve comprising:
   a. A substantially cylindrical spool sleeve in the bore, having an outer diameter adapted to be received in the central bore and an inner diameter;
   b. A spool sleeve liner having an outer diameter adapted to be received in the spool sleeve inner diameter and an inner diameter adapted to receive the plunger;
   c. At least one removable liner seal between the spool sleeve inner diameter and the liner outer diameter, the spool sleeve of longer longitudinal length than the liner, wherein the portion of the spool sleeve outside the liner is of an intermediate inner diameter smaller than the outer diameter of the liner but larger than the inner diameter of the liner; and d. At least one circumferential seal being adapted for contacting the plunger; and e. A media inlet port in the body and in communication with the bore, the circumferential seal being positioned adjacent the port for minimizing a wedging action from accumulated media grit.

2. The media control valve of claim 1, wherein the liner seal comprises an o-ring.

3. The media control valve of claim 2, wherein the spool sleeve inner diameter includes a circumferential channel for receiving and seating the o-ring.

4. The media control valve of claim 1, further including at least one removable bore seal positioned between the central bore and the outer diameter of the spool sleeve.

5. The media control valve of claim 4, wherein the bore seal comprises an o-ring.

6. The media control valve of claim 5, wherein the spool sleeve outer diameter includes a circumferential channel for receiving and seating the o-ring.

7. The media control valve of claim 1, wherein the spool sleeve is made of a first material and the liner is made of a second material.

8. The media control valve of claim 7, wherein the spool sleeve is made of a material which is softer than the material of the liner.

9. A spool sleeve assembly for a media control valve, the spool sleeve assembly adapted to be received in the central bore of the media control valve, the spool sleeve assembly comprising:

a. A substantially cylindrical component having an outer diameter adapted to be received in the central bore, and an inner diameter;

b. A spool sleeve liner having an outer diameter adapted to be received in the spool sleeve inner diameter and the liner outer diameter, the spool sleeve of longer longitudinal length than the liner, wherein the portion of the spool sleeve outside the liner is of an intermediate inner diameter smaller than the outer diameter of the liner but larger than the inner diameter of the liner; and c. At least one circumferential seal adapted for contacting the plunger.

10. The media control valve of claim 9, wherein the liner seal comprises an o-ring.

11. The media control valve of claim 10, herein the spool sleeve inner diameter includes a circumferential channel for receiving and seating the o-ring.

12. The media control valve of claim 9, further including at least one removable bore seal positioned between the central bore and the outer diameter of the spool sleeve.

13. The media control valve of claim 12, wherein the bore seal comprises an o-ring.

14. The media control valve of claim 13, wherein the spool sleeve outer diameter includes a circumferential channel for receiving and seating the o-ring.

15. The media control valve of claim 9, wherein the spool sleeve is made of a first material and the liner is made of a second material.

16. The media control valve of claim 15, wherein the spool sleeve is made of a material which is softer than the material of the liner.

17. The media control valve of claim 9, wherein the spool sleeve outer diameter is smaller than the central bore.

18. The media control valve of claim 9, further including an o-ring seal between the inner diameter of the bore and outer diameter of the spool sleeve.

* * * * *